UNITED STATES PATENT OFFICE.

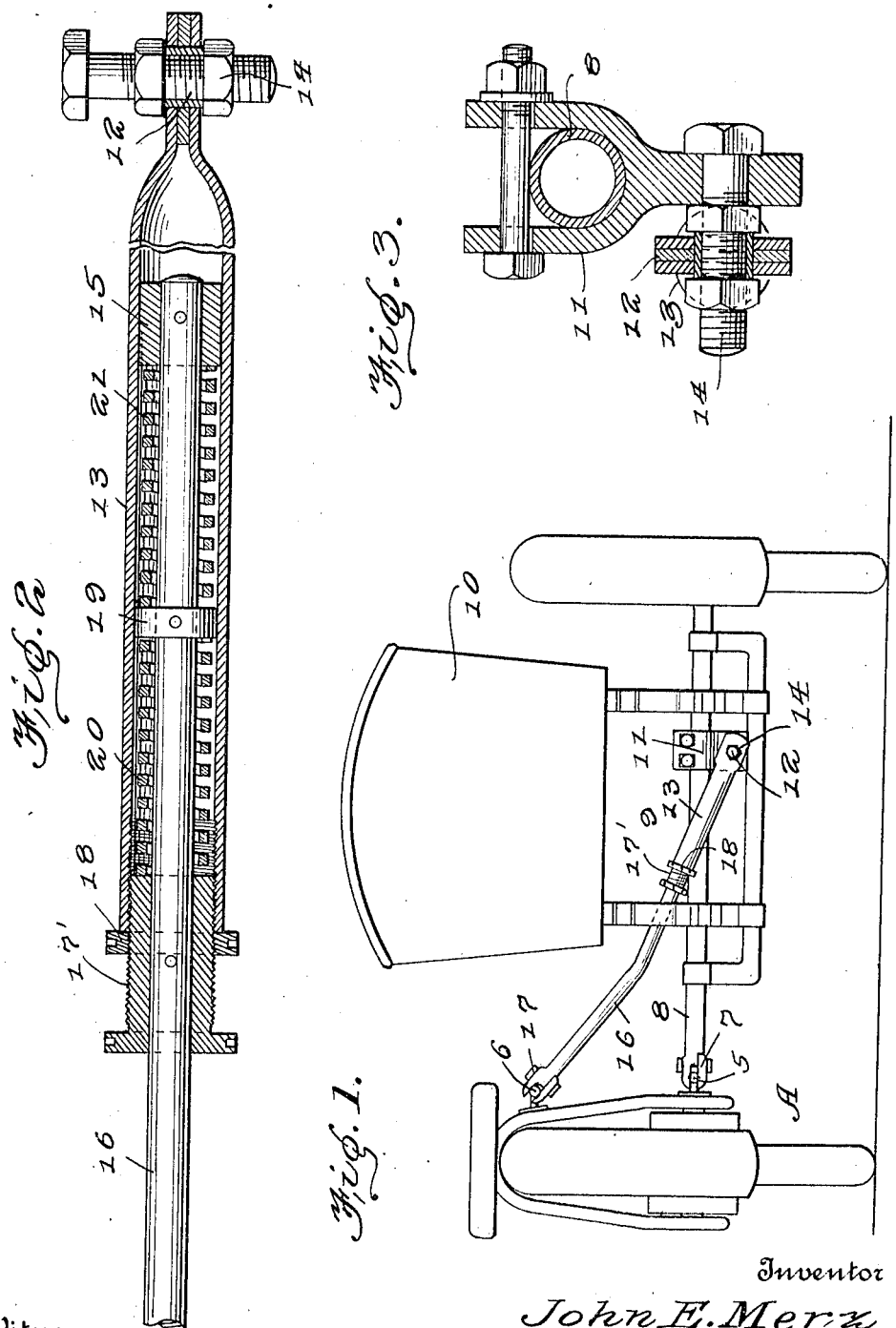

JOHN E. MERZ, OF INDIANAPOLIS, INDIANA.

SHOCK-ABSORBING COUPLING.

1,270,186.   Specification of Letters Patent.   Patented June 18, 1918.

Application filed October 6, 1917. Serial No. 195,152.

*To all whom it may concern:*

Be it known that I, JOHN E. MERZ, a citizen of the United States, residing at Indianapolis, in the county of Marion and State of Indiana, have invented new and useful Improvements in Shock-Absorbing Couplings, of which the following is a specification.

This invention relates to a coupling which is primarily intended for use between motorcycles and the side cars connected therewith.

The primary object of the invention is to provide a durable and inexpensive coupling of this character which when arranged between a motorcycle and the side car connected therewith will prevent strains and shocks being transmitted from one of these vehicles to the other and is so constructed as to render the motorcycle and car capable of being turned in a smaller space than is possible where the cycle and the car are connected in the usual manner.

Another object of the invention is to provide a coupling of this character which embodies a construction whereby the coupling may be applied for the purpose stated to the various makes of the above mentioned vehicles now in use.

With these and other objects in view, the invention resides in the novel combination and arrangements of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications within the scope of the claims may be resorted to when desired.

In the drawings:—

Figure 1 is a rear elevation of a motorcycle having connected therewith a side car between which and the motorcycle is shown arranged a coupling constructed in accordance with the invention.

Fig. 2 is a vertical longitudinal sectional view through the improved coupling.

Fig. 3 is a view of the clamp by means of which the improved coupling may be connected with the running gear of the side car.

Like characters of reference denote corresponding parts throughout the several views in the drawing.

Referring now to the drawing in detail, the letter A designates a motorcycle of a type now in common use having secured to the frame thereof headed studs 5 and 6. The stud 5 is engaged with a socket 7 at one end of an arm 8 on the running gear 9 of the side car 10. A clip 11 is mounted on the running gear on the side car 10 and carries a bolt 12. The bolt 12 is passed through an opening in the flattened end of a tubular housing 13 which is retained upon the bolt by a nut 14.

The housing 13 forms a part of the improved coupling and has disposed therein adjacent its flat end a guide 15 engaged by a rod 16 which extends within the housing and has its outer end forked, as at 17 to provide a socket for connection with the stud 6. Slidably mounted on the rod 16 is a headed nut 17' which is threadedly engaged with the inner wall of the tubular cassing 13. The nut 17' is held in adjusted position within the housing 13 by a locking collar 18 which is adjustably mounted on the nut and adapted to bear against an end of the housing. A collar 19 is arranged within the housing 13 and is fixed to the rod 16 and upon opposite sides of this collar are coiled expansion springs 20 and 21. The spring 21 engages the collar and the guide 15 which serves as an abutment therefor, while the spring 20 engages the collar 19 and an end of the nut 17'. By arranging the springs 20 and 21 as above described it is apparent when the coupling has been applied to a motorcycle and side car as above described shocks and strains incident to the travel of a vehicle over an uneven surface are prevented from being communicated from one vehicle to the other, while through the adjustment of the nut 17' within the housing 13 the tension of the springs 20 and 21 may be regulated.

By so connecting the rod 16 with the housing 13 that these two members are yieldably held against longitudinal movement with relation to each other the space in which the motorcycle and car connected therewith may be turned is considerably reduced over the space required for the turning of vehicles of this character which are connected by the coupling now in use, as the improved coupling permits the motorcycle to lean toward the inside of the turn while turning.

From the foregoing description taken in connection with the accompanying drawing it is apparent that a device for the purpose set forth has been provided which is easily applied, inexpensive of manufacture and highly efficient in use.

Having thus described the invention, what is claimed as new, is:—

1. The combination with a motorcycle having a side car associated therewith, of a housing pivotally connected with the running gear of said side car, cushioning means within said housing, and a rod swingingly connected with the frame of said motorcycle and engaging said cushioning means.

2. The combination with a motorcycle having a side car associated therewith, of a clamp on the running gear of said car, a housing pivotally connected with said clamp, a rod pivotally connected with the frame of a motorcycle extending within said housing, and springs within said housing engaged therewith and with said rod.

3. In a device of the class described, a tubular housing, a guide within said housing, a nut adjustably mounted within an end of said housing, a rod slidably mounted in said nut and guide extending exteriorly of the housing, a collar on said rod within said housing, a spring on said rod terminally engaged with said collar and guide, and a second spring on said rod terminally engaged with said collar and nut.

In testimony whereof, I affix my signature.

JOHN E. MERZ.

Copies of this patent may be obtained for five cents each, by addressing the "Commissioner of Patents, Washington, D. C."